(12) United States Patent
Waisman et al.

(10) Patent No.: US 9,939,631 B2
(45) Date of Patent: Apr. 10, 2018

(54) MULTIPLE LASER CAVITY APPARATUS

(71) Applicant: LUMENIS LTD., Yokneam Ilit (IL)

(72) Inventors: Tal Waisman, Yokneam Ilit (IL);
Arkady Khachaturov, Haifa (IL);
Moshe Elazar, Kadima-Tzoran (IL);
Alla Shnaider, Yokneam Ilit (IL);
Assaf Preiss, Shimshit (IL); Izchak Zobel, Raanana (IL)

(73) Assignee: LUMENIS LTD, Yokneam (IL)

( * ) Notice: Subject to any disclaimer, the term of this patent is extended or adjusted under 35 U.S.C. 154(b) by 425 days.

(21) Appl. No.: 14/660,979

(22) Filed: Mar. 18, 2015

(65) Prior Publication Data

US 2015/0293348 A1 Oct. 15, 2015

Related U.S. Application Data

(60) Provisional application No. 61/978,046, filed on Apr. 10, 2014.

(51) Int. Cl.
| | |
|---|---|
| *G02B 26/08* | (2006.01) |
| *G02B 26/10* | (2006.01) |
| *G02B 26/12* | (2006.01) |
| *H01S 3/00* | (2006.01) |
| *G02B 27/09* | (2006.01) |
| *H01S 3/23* | (2006.01) |
| *H01S 3/092* | (2006.01) |
| *H01S 3/102* | (2006.01) |
| *H01S 3/02* | (2006.01) |
| *H01S 3/06* | (2006.01) |

(52) U.S. Cl.
CPC ...... *G02B 26/0816* (2013.01); *G02B 27/0905* (2013.01); *G02B 27/0977* (2013.01); *H01S 3/005* (2013.01); *H01S 3/2383* (2013.01); *H01S 3/0071* (2013.01); *H01S 3/025* (2013.01); *H01S 3/061* (2013.01); *H01S 3/092* (2013.01); *H01S 3/1024* (2013.01)

(58) Field of Classification Search
CPC .............. G02B 26/105; G02B 26/0816; G02B 26/0841; G02B 26/101; G02B 26/0833
See application file for complete search history.

(56) References Cited

U.S. PATENT DOCUMENTS

2011/0310921 A1* 12/2011 Chann ................ G02B 27/0905
372/70

* cited by examiner

Primary Examiner — Bumsuk Won
Assistant Examiner — Tamara Y Washington
(74) Attorney, Agent, or Firm — Isus Intellectual Property PLL; A. Jason Mirabito

(57) ABSTRACT

A multiple cavity laser system includes: a controller configured to operate the system as well as a plurality of laser cavities, each of the laser cavities having an output end wherein, when activated by the controller, an output laser beam is emitted from the output end of each of the laser cavities. The output laser beams when activated are directed, either directly or indirectly, to a rotating mirror. The rotating mirror is operatively connected to the controller and a servo motor. The servo motor, under direction of the controller, redirects the output laser beams along a common optical axis and the output laser beams of the plurality of laser cavities are combined along the common optical axis.

14 Claims, 7 Drawing Sheets

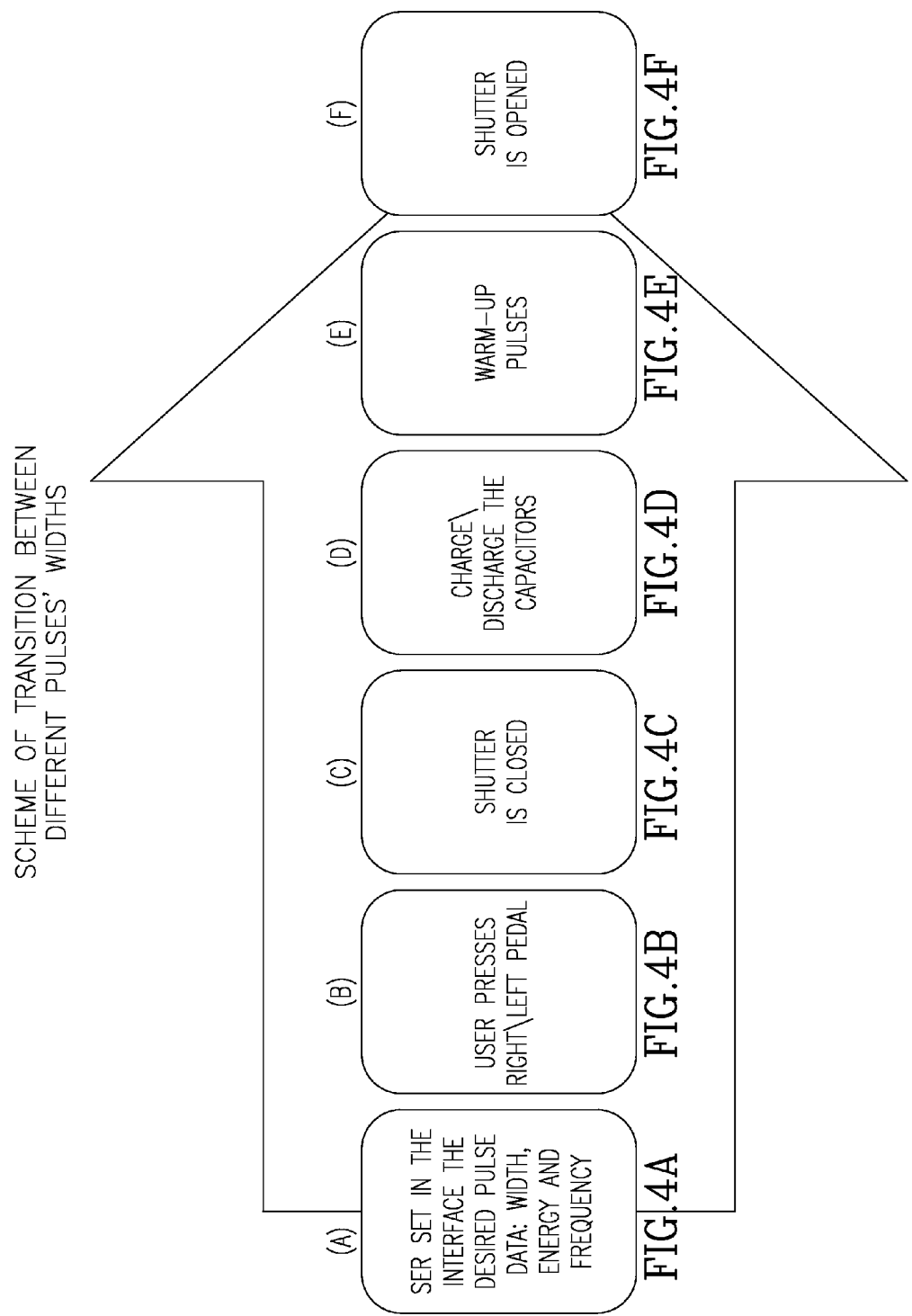

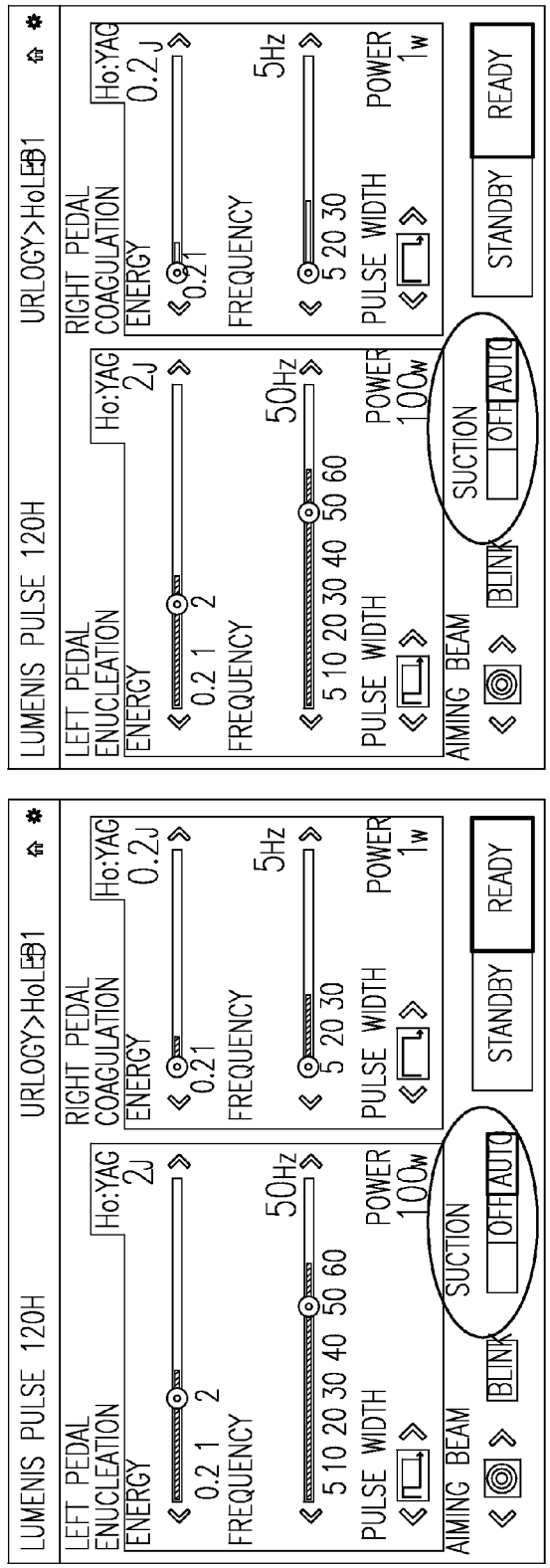

MULTIPLE LASER CAVITY APPARATUS

CROSS REFERENCE TO RELATED APPLICATION

This application claims the benefit of priority to U.S. Provisional Patent Application No. 61/978,046, filed Apr. 10, 2014. The complete disclosure of this application is hereby incorporated by reference herein.

FIELD OF THE INVENTION

The present invention relates to laser apparatus suitable for surgical and non-surgical applications in which a plurality of laser cavities are incorporated into a unitary housing.

BACKGROUND OF THE INVENTION

In one aspect, this invention relates to laser apparatus in which multiple laser cavities are contained within a unitary housing. The laser cavities may all be of the same type, power and wavelengths or they may be of different power levels, wavelengths and types. One such laser apparatus is sold under the trademark VersaPulse by Lumenis of Yokneam, Israel. In the apparatus, four laser cavities are contained in a unitary housing. The outputs of the four laser cavities may be combined by using suitable mirrors and lenses so that the output is a single laser beam which is the combined output of the four laser cavities. In the device, a 90 degree step-rotating mirror folds and combines the four beams sequentially from the four laser cavities into a common optical path. The device is also described generally in the following US patents, all of which are herein incorporated in their entirety by reference: U.S. Pat. Nos. 5,375,132, 5,659,563, 5,781,574, 5,999,555 and 6.115.396. Of course, depending on the number of laser cavities and the housing in which the laser cavities are installed, the 90 degree rotating mirror may be a lesser or a greater number of degrees. In this type device, the 90 degree step-rotating mirror optically switches the laser outputs from the four cavities. The relative position of the step-rotating mirror relative to each laser cavity defines the overlap-level of the laser beams along their common optical path. Ideally, all four laser beams are fully aligned into a single and uniform common optical path without any offsets. However, since the step-rotating mirror is limited to 90 degrees steps only and since the position of the four cavities is not precisely in exact 90 degrees orientation to each other (for example, 90+/−0.5 degrees), aligning the step-rotating mirror to one cavity results in some misalignment to the others. The above degree of uncertainty is the primary reason of mutual misalignment of the four laser cavities.

The lasers are fired rapidly, the mirror must react and be able, as it rotates in steps, to combine all the beams so that a uniform, fully overlapped single beam is outputted from the apparatus. The four laser beams are separated in time due to the rotating mirror but the optical path must be the same and aligned. In the above known device, prior to the present invention, the alignment point of the step-rotating mirror actually averages the four optimal alignment points of each of the four cavities. However, this may lead to a reduction in the overall combined laser beam output quality as a result of four slightly different optical paths Turning now to FIG. 1, the figure shows a schematic of a multiple laser cavity apparatus. Although only two laser cavities are shown, this is due to the perspective of the drawing. It can be seen that in a perspective orthogonal to the page that two additional laser cavities can be accommodated. As can be seen in FIG. 1, the laser cavities 10 and 12 output two laser beams to an arrangement whereby each impinges on mirrors 14, 16, 18 and 20. Those mirrors then reflect the respective laser beam onto a rotating mirror 22 which is driven by a servo motor and position encoder 24. It is to the rotating mirror and position encoder that the present invention is, in part, directed. The rotating mirror, as can be seen in FIG. 1, then directs the two light beams b 26 and 28 from, respectively, laser cavities 12 and 10 onto first and second mirrors 30 and 32 and eventually to output 34. The third and fourth cavities have similar optical paths like 10 and 12 and they also combine in the rotating mirror 30. Mirrors 30 and 32 are common for the four laser beams from the four laser cavities. The beams are separated in time not slightly. They are sequentially generated by the four laser cavities. The rotating mirror needs to arrive at the right position at the right time to reflect the appropriate beam along the same optical path. If not so, the optical paths will differ from one another. A safety shutter 36 is also included the light path as seen in FIG. 1, the purpose of which will be discussed in greater detail below. Changes made to the structure and operation of the servo motor mirror the servo motor and position encoder will be described below in the section entitled "Detailed Description" below.

In another aspect, apparatus such as described above which includes multiple laser cavities or even a singular laser cavity require a source of power to charge the flash lamps such as 40 and 42. Conventionally, in known devices this may be accomplished by charging one or more large capacitors in a capacitor bank and rapidly discharging those capacitors into the flash lamps thus causing excitation of the laser rods 44 and 46 as seen in FIG. 1. Existing systems and off-the-shelf lamp switches and IGBTs function well to "fast charge" these capacitor banks. This provides the ability to quickly charge already discharged capacitors from a low-energy state to a high energy state at a fast rate. However, there is no off-the-shelf, easy solution to discharge. In normal practice, the preference is to discharge the full energy from the capacitors and not to stop at some point in the discharge process. Power levels may range from 20-150 watts or from 100-150 watts.

However, in many applications, it may be desirable for the operator of a laser apparatus such as, but not limited to, the above described apparatus to change the pulse width from among: a short pulse, a medium pulse and a long pulse. One aspect of the present invention is directed to a solution to allow rapid and controlled discharge of the capacitor banks so that the pulse width may be rapidly changed and controlled by the user through the user interface. A full explanation of the operation and structure of this aspect of the present invention will be found in the "Detailed Description" below.

In yet another aspect, in known laser apparatus devices the laser cavities are cooled, usually by water. Allowing the laser to become too hot can cause overheating, faulty operation, decreasing laser efficiency and even destruction of the laser cavity, all undesirable results. In addition, it is desirable that the laser apparatus operate in a normal ambient room temperature and humid environment rather than a specialized, climate-controlled environment. A specialized environment required a sealed and controlled environment. It is another aspect of the present invention to create a laser system which is not sealed and in fluid communication with the ambient room environment. In known systems having laser cavities which are open to ambient room conditions, the water which is used to cool the laser cavities and the remainder of the laser apparatus is not actively cooled to avoid condensation. Ambient room temperature systems, having a volume of water large enough to absorb the heat from the laser and through known heat exchange devices and this is usually sufficient to keep the laser at normal operating temperature. In contrast, sealed laser cavities may actively cool the water without risking damage to the cavity due to condensation. Laser energy absorption by condensed water, especially condensed water on the laser rod and especially on the lasing side of the rod, may significantly harm the laser cavity. This is risk which is greatly increased with solid state lasers having high absorption coefficients in water such as Holmium and the like having wavelengths higher than about 1.5 microns. However, in order to operate, open cavity lasers such as in accordance to one aspect of the present invention in other than ideal ambient temperature situations including high humidity situations, present non-active cooling systems may be insufficient to keep laser cavities at an ideal temperature in which they operate most efficiently and potentially cause damage and/or destruction to the laser cavities due to overheating. The main reason why this is not desirable is the decreased in the output power due to the apparatus having to work at higher temperatures. Thus, there is a need for a more efficient, active cooling system to allow for cooling of the lasers in both ideal and not so ideal environments in an open cavity configuration. This aspect of the present invention is further described in the "Detailed Description" below.

In yet another aspect, one application of the above described laser apparatus is, by way of example only, applying the output of the combined laser beams in the apparatus of the present invention to break up kidney stones or stones in the bladder. Typically, this is done by outputting the laser beam 34 of FIG. 1 through to a suitable optical fiber which is threaded into the kidneys and or the bladder. The laser output beam travels from the output 34 through the optical fiber and exits at an optical fiber end within the bladder or kidney and is aimed, for example, at the stones to break them up. An aiming beam may also be present to allow the physician to accurately aim the ablation laser at the desired target to be fragmented. Typically, the aiming beam may be a 532 nm green aiming beam and the ablation beam may be a Holmium beam of 2100-2112 nm. Also, there may be a need to provide an apparatus which may allow fast switching of the output laser state from a high energy cutting/ablation state to a lower energy, coagulating state.

It is to the above aspects of the present invention that the below "Detailed Description" is directed.

SUMMARY OF THE PRESENT INVENTION

In an aspect, a multiple cavity laser system includes a controller configured to operate the system; a plurality of laser cavities, each of the laser cavities having an output end wherein, when activated by the controller, an output laser beam is emitted from the output end of each of the laser cavities. The output laser beams, when activated, are directed, either directly or indirectly, to a rotating mirror. The rotating mirror is operatively connected to the controller and a servo motor. The servo motor, under direction of the controller, redirects the output laser beams along a common optical axis, wherein the output laser beams of the plurality of laser cavities are combined along the common optical axis.

In a second aspect, the multiple cavity laser system includes X number of cavities; the servo motor includes a position encoder; and wherein the position encoder is directed by the controller to position the rotating mirror to receive the output laser beams of the X number of cavities as the rotating mirror is in line with the respective output laser beams.

In another aspect, the laser cavities are arranged with the cavities parallel to one another and the output ends are arranged at the same end of each of the laser cavities. The number of laser cavities is four.

In another aspect, the rotating mirror is positioned to receive the output of each of the plurality of laser beams when activated. One or more mirrors are positioned to receive the output laser beams and direct the beams to the rotating mirror. One or more mirrors are positioned to receive the output laser beams from the rotating mirror and direct the beams to the common optical axis.

In yet another aspect, laser spots formed as an output of the plurality of laser beams onto the rotating mirror are non-aligned and the controller directs the position encoder to calibrate the positions of the laser spots to determine and store the number of steps of the encoder to bring the laser spots into alignment.

In another aspect, the controller calibrates the plurality of laser cavities on an individual basis, whereby the controller adjusts the position of the rotating mirror for each of the laser beams emitted by each of the laser cavities.

In a further aspect, a safety shutter is provided which is selectively insertable into the common optical axis under direction of the controller.

In another aspect, the controller stores the position encoder in line positions for each of the cavities and controls the retrieval of the in line positions as the rotating mirror moves to cause the rotating mirror to be in line with each of the when the output beams are activated. The laser cavities are arranged in a 2×2 orientation.

In yet a further aspect, a method of operating a multiple cavity laser system includes: providing a controller configured to operate the system; providing a plurality of laser cavities, each of the laser cavities having an output end wherein, when activated by the controller, an output laser beam is emitted from the output end of each of the laser cavities; providing a rotating mirror operatively connected to the controller and to a servo motor to which the output laser beams, when activated, are directed. In this arrangement, the servo motor, under direction of the controller, redirects the output laser beams along a common optical axis, whereby the output laser beams of the plurality of laser cavities are combined along the common optical axis.

BRIEF DESCRIPTION OF THE DRAWINGS

FIGS. 4A to 4F illustrate steps in the present invention to implement a pulse width modification.

FIGS. 5A and 5B illustrate a user interface in two modes in connection with apparatus of the present invention to control lasing and suctioning modes of operation.

DETAILED DESCRIPTION OF THE PRESENT INVENTION

Rotating Mirror Control

Figure 1:
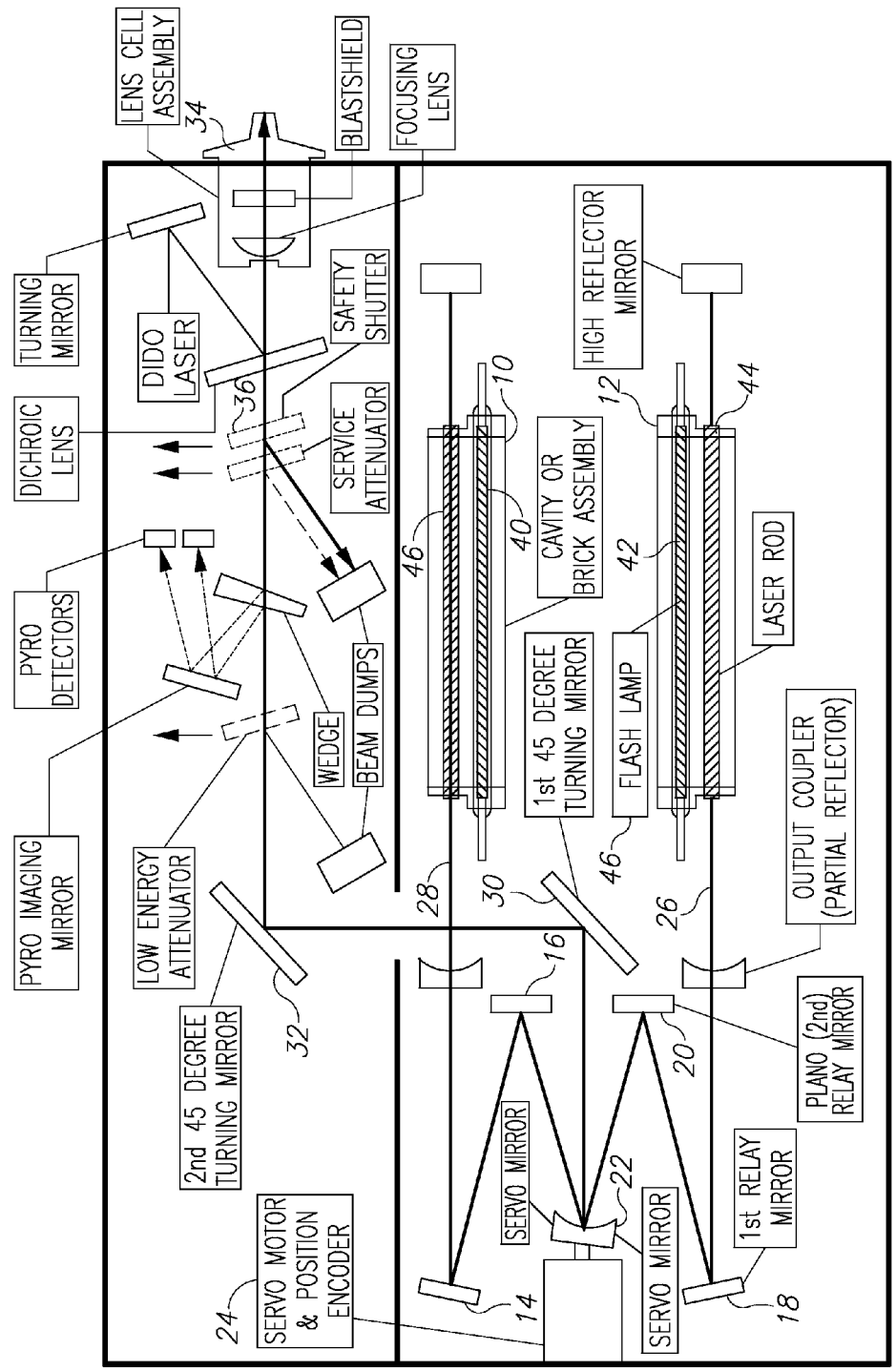
FIG. 1 is a schematic description of a known multiple cavity laser apparatus.

As discussed above, a suitable mirror 22 and its motor and position encoder 24 are used to direct the plurality of laser beams to a common output at 34 in a way that each of the four laser beams is combined with the others. Since the rotating mirror rotates to intercept each of the four laser beams sequentially and then sends those beams to output 34, necessarily the beams will arrive at the output 34 at slightly different but still close times. In the existing system described herein, the servomotor provided only 90° fixed steps, given the example of four laser cavities arranged along the same axis in a 2×2 orientation. Thus, the servomotor 24 moves in four steps to cover all four cavities and this action folded their beams into a common optical path with the output, as mentioned, at 34. During assembly, the rotating mirror can be calibrated relative to a first cavity. However, as to the other three cavities, a compromise of the relative location of the mirror the other cavities was needed since only 90° steps were available using servomotor 24. In the present invention, the rotating mirror can make movements in small steps and thus allow calibration of all four cavities both during the manufacture of the apparatus or when replacing defective cavities in the field much more accurately then in the past. For example, the servomotor can be set to step from the first cavity to the second cavity by only, for example, 89.6° while then stepping 90.3° to the third. By providing this flexibility this improves the stability accuracy and overlap of the four beams once folded into a combined optical path. Selection of a faster motor than the motor 24 shown in FIG. 1 allows the system to work at higher frequencies, in the range of 5-100 Hz. Additional frequencies may range from 40-100 Hz, or 50-80 Hz. Furthermore, the accuracy of the combined beam allows the output to be more precise and aligned and to operate with smaller optical fiber diameters, in the range of 200 to 230 µm. Other diameter ranges from 100-500 um, 250-400 um and 200-300 um. This provides significant advantages over known systems such as those described above.

Figure 2A:
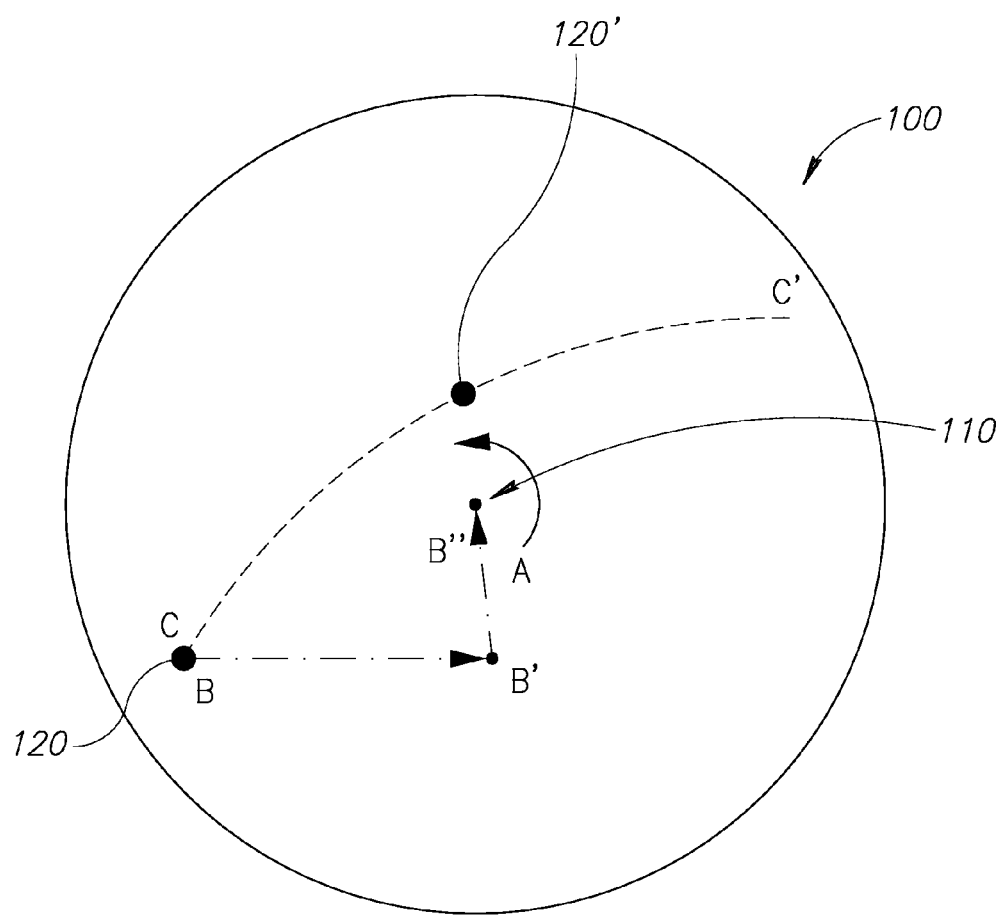
FIG. 2A is a schematic view of a light beam impinging on a rotating mirror.

Turning attention now to FIG. 2A, this figure shows a rotating mirror 100 having a center point 110. A motor with the capabilities described in the previous paragraph rotates the mirror 100 around its center point 110 in a direction shown for example as arrow A around the center point 110 and an axis perpendicular to the drawing figure. An incident beam, such as beam 26 or 28 of FIG. 1, coming from one of the laser cavities 10 or 12 impinges upon rotating mirror 100 at point 120. Ideally, actual laser spot 120 onto rotating mirror should coincide with center point 110. Also, ideally, all four actual laser spots from each of the four cavities should coincide irrespective of which laser the beam came from. However, misalignments cause the actual laser spot 120 and the other laser spots to fall off from the center point 110. If the system had the ability to calibrate the beam with two degrees of freedom by moving the rotating mirror along X and Y axis, it could calibrate the system by adjusting correlating to lines B-B' along one dimension and by another adjustment along line B'-B in the second dimension. However, since the system has only one degree of freedom to control such alignment, that is, the rotation of mirror 100 around its center point 110, the actual beam spot 120 can only be moved by slightly rotating the mirror along line C-C' to its closest location to the center point 110 which is 120'.

The encoder 24 discussed above is operatively connected with the controller. In the present embodiment, there are four laser cavities. The controller has a memory of a known type which stores, for each cavity, the position 120' which is the closest point to the center 110 that the laser spot for a particular laser cavity can approach. Once a particular laser cavity has been activated, the controller will cause the encoder to move the mirror to spot 120' for that particular laser cavity. Thus, there will be stored, for the four laser cavities in the present embodiment, four positions 120' corresponding to the four cavities. If there are more or less cavities than four, the number of positions 120' stored in the memory of the controller will change accordingly.

The system then stores the number of steps necessary to bring each of the laser cavity beams to its individual optimized point 120'. It should be noted that since each laser cavity is expected to have at least a minimum different orientation relative to the mirror than the other cavities, each cavity will have its own circle C-C' along which the beam moves in its own closest point 120'. The above process may be followed not only during normal assembly of the multiple cavity apparatus but also during laser cavity replacement. With the above-described control over the rotating mirror, each cavity is aligned to the rotating mirror separately and, during operation, the controller of the system knows exactly which adjustment needs to be given to the servomotor order to bring the mirror to the optimal location relative to be then activated laser cavity.

Figure 2B:
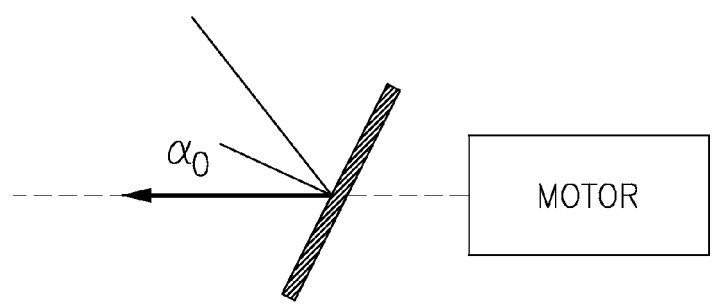
FIGS. 2B-2D illustrate characteristics of the rotating mirror tilt angle.

Furthermore, the rotating mirror, by means of which 4 laser beams are combined into the same optical path, is tilted with respect to the rotating axis that is the motor axis. The tilt is $\alpha_0 \approx 4.22°$ as shown in FIG. 2B. Due to the limitations of motor position measurement systems there is always some uncertainty in the mirror position, which results in the beam deflection in the desired direction. The maximal angular error of the mirror position depends on the resolution of the motor position measurement device. As an example in the case of an optical encoder, the amount of encoder lines, N=500, and could be evaluated as $$\beta = \frac{2\pi}{N} = 0.72°$$

Note that this angle relates to the rotation around the motor axis.

It should be understood that such a rotation results not only in a variance of the angle $\alpha_0$, but also outputs the reflected beam off the plane of the drawing. That's why two different angles $\alpha_\rightarrow$ and $\alpha_\uparrow$ in orthogonal planes have to be taken into consideration.

Figure 2C:
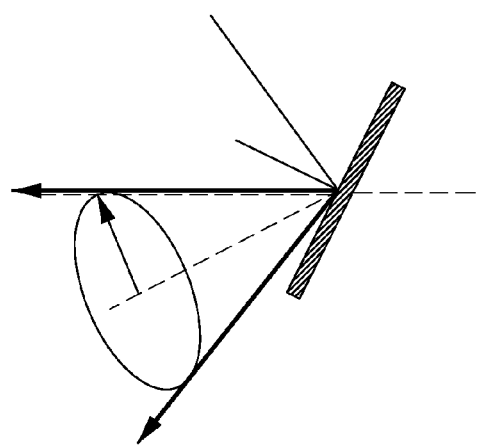

While rotating, the reflected beam follows a cone with a full plane angle of $4\alpha_0$ ($2\alpha_0$—amplitude) as shown in FIG. 2C.

Both mentioned above angles ($\alpha_\rightarrow$ and $\alpha_\uparrow$) may be considered as sin and cos—components of the reflected angle variations.

$$\alpha_\rightarrow = 2\alpha_0 \cos\beta \approx 2\alpha_0 \left(1 - \frac{\beta^2}{2}\right)$$

$$\alpha_\uparrow = 2\alpha_0 \sin\beta \approx 2\alpha_0 \beta$$

Appropriate beam deflections are $$\delta\alpha_\rightarrow \approx 2\alpha_0\left(1 - \frac{\beta^2}{2}\right) - 2\alpha_0 \approx -\alpha_0\beta^2 \approx -1.1\times 10^{-2}\ mRad$$

$$\delta\alpha_\uparrow \approx 2\alpha_0\beta \approx 1.8\ mRad$$

Figure 2D:
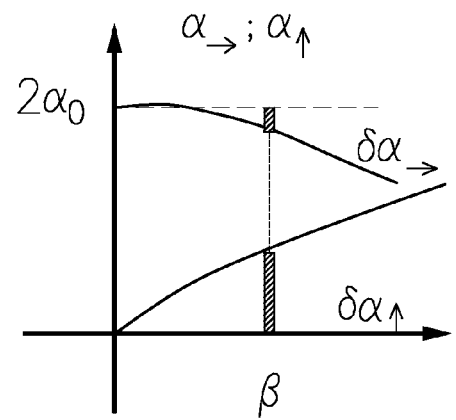

FIG. 2D graphically explains all mentioned above.

The fact that the rotating mirror is actually curved does not affect the result, because it relates to the central beam.

It is clear that the larger deflection angle $\delta\alpha_\uparrow \approx 1.8$ mRad must be taken for further calculation. Assuming the focal length of focusing lens to be F≈33 mm one can evaluate the spot shift in the focal plane Shift≈F×$\delta\alpha_\uparrow$≈59 μm Once more, this is the maximal shift value in assumption that the encoder error is equal to its discrete level. The shift may be decreased by using a more precise encoder with increased amount of encoder lines. Another way is to use a more precise encoding algorithm, such as using several shifted clock series or to use a different more precise position measurement device.

Limiting the maximal spot shift in the focal plane to the level of 8 μm one can calculate that the mirror positioning error must be less than β≈0.1°, which is derived from the design of the fiber, the fiber port and their tolerances.

Due to the use of the above-described rotating mirror control, smaller diameter optical fibers in the range of about 200 um may be utilized because of the more precise alignment of the plurality of beams from the multiple laser cavities into a single laser beam output. This has a number of beneficial effects, including the ability to use lower profile fiber inserted into the patient's body. The precision of the servo motor also allows the use of operation at higher frequency rates above 50 Hz, including up to about 80 Hz.

Fast Discharge of the Capacitor Bank

This aspect of the present invention is directed to the control of the pulse width of the laser beam emanating from output 34 shown in FIG. 1. This can be accomplished by changing the voltage on the capacitor bank, such as from about 850V to 650V or even to 550V. For example, a short pulse width may be in the range of approximately 120 to 600 us. The medium pulse width may be in a range of approximately 600 to 700 us and long pulse width may be in the range of approximately 700 to 1600 us. The transition between the various pulses width regimes preferably may be short enough not to cause annoying delays for the operator.

Figure 3B:
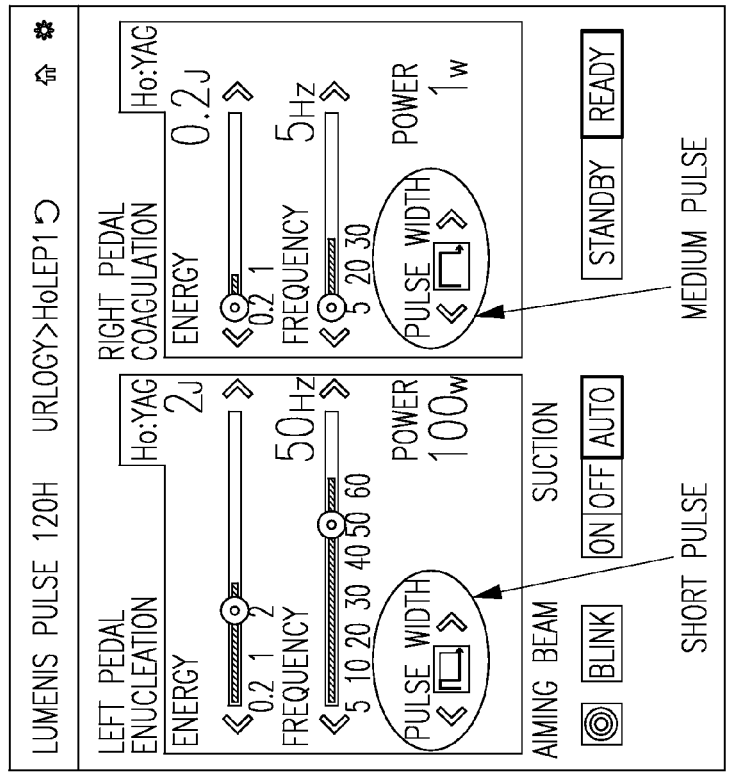
FIGS. 3A and 3B illustrate a user interface in connection with the apparatus of the present invention.
Figure 3A:
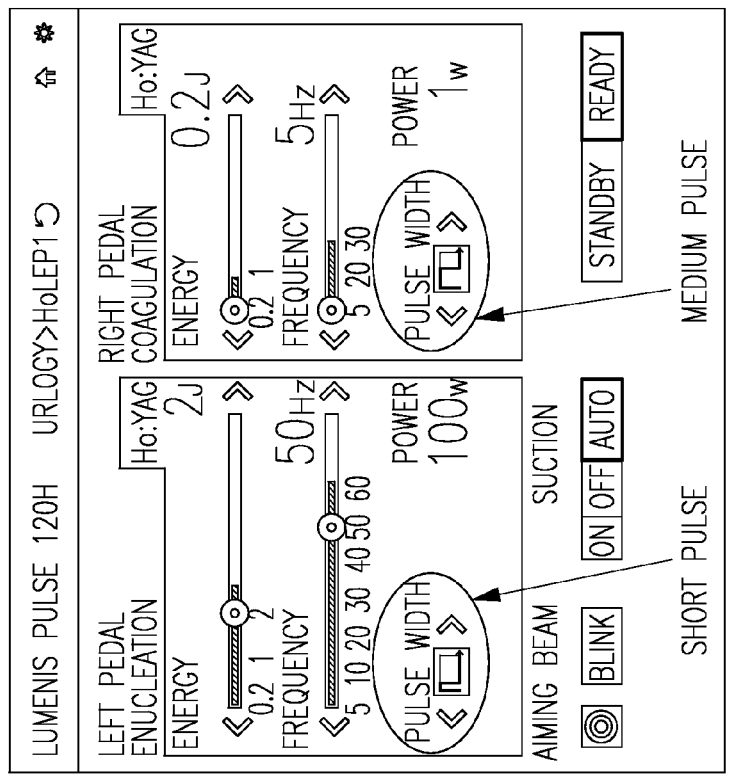

As shown in FIGS. 3A and 3B, these figures illustrate a user interface on a laser apparatus of the type described above which permits the operator to quickly change the power regime and thus the laser-tissue interaction regime. As can be seen in FIG. 3A, the user is given, on a user interface screen, a number of options, including the option to set up the pulse widths of two pulse modes (for example short pulse and medium pulse) and other working parameters, such as energy level and frequency. The other working parameters of each pulse mode may be predefined by the manufacturer to allow the physician to make fast switching during a procedure between the first predefined pulse mode and a second predefined pulse mode. By simply touching the user interface screen, or actuating a remote user interface device such as a multi-pedal footswitch, hand switch or the like, the physician can cause, on the fly, a change in pulse width and profile from, by way of example, a short pulse characterized with a set of working parameters associated with tissue cutting, to a medium pulse characterized with a set of working parameters associated with tissue coagulating. In FIG. 3B, in another view of the same user interface screen, the physician is presented with a short, tissue-cutting pulse and a long, tissue-coagulating pulse. Alternatively, the physician could select the desired outcome, for example, hemostasis, minimal retropulsion and the system would automatically select the desired parameters, including, the desired pulse width. Once the physician has selected a long or medium or short pulse, the system may cause a controller which has control over the capacitor bank to deliver the appropriate pulse width. This may be accomplished by providing an electronic circuit and a shutter arrangement which will discharge the charged capacitor bank by lasing while the shutter is on (so that no optical energy is outputted through output 34), to the desired preselected energy level so that a long or medium or short pulse, having preselected profiles of working parameters, may be produced as a result further lasing while the shutter is off.

As described above with reference to FIG. 1, a safety shutter 36 may be interposed along the unitary optical path prior to the laser beam reaching output 34. One reason for the presence of the shutter 36 in the known device is that the shutter is used to warm the laser rods into the higher temperatures suitable for operation by so-called "blind" lasing. In practice, the shutter is used to block undesired pulses, such as pulses which are not within the set user parameters for pulse energy. In the present invention, high energy pulses delivered at high frequencies are used to discharge the capacitors. When activated (these pulses are not in the set user parameters but are set, for example, by the system designer), the shutter is "on" for "blind" lasing. In general, the desire here is to maintain the laser rod at a constant temperature through, in large part, the use of the active cooling system described in the present invention below. The shutter arrangement, followed by at least one damper, is designed to absorb the laser energy reflected internally from the shutter to the damper during the so-called "blind" lasing. In the present invention, this same shutter is used to control the discharge of the capacitor bank and to do so in a rapid fashion. Previous solutions and other solutions for rapid discharge may require more electronics, special discharging circuits and specialized switches and IGBTs be utilized to provide for rapid discharge. Thus, under control of the controller of the system, the laser beam will utilize this shutter to absorb the energy reflected internally during "blind" lasing until the desired voltage decrease has been reached, at which point the shutter is moved out of the optical path in the laser cavity allowed to discharge through the output 34. Thus, this provides a simple solution to what was heretofore a complex problem and does so without the addition of further hardware. According to one aspect of the present invention, all laser cavities can fire one after another for discharging or only part of each of laser cavities. The challenge has been to do discharging as fast as possible without heating the laser rod too much which could cause damage to the laser rod.

Turning now to FIG. 4, this figure shows the sequence by which different pulse widths can be delivered by the laser apparatus. In a first step (A), the operator sets in the interface of FIGS. 3A and 3B the desired pulse profile (energy, frequency) and pulse width. Next, in step (B), the user presses an included right or left pedal to cause the device to produce the desired pulse width for the laser beam. In the next step (C), the shutter 36 shown in FIG. 1 is moved into the optical path of the laser beam and as described above laser cavities are fired to discharge the capacitors to the desired level as noted in step (D) of FIG. 4. Next, the laser apparatus is warmed up through the use of the shutter 36 and the so-called "blind" lasing in step (E). When the discharge of the capacitor bank level has been reached, such as, by way of example only, approximately 650V, in step (F) the shutter 36 is off or in an open non-occlusive position or removed from the optical laser path and the lasers cause to fire with the desired in control pulsed width(s). Thus, by using an existing portion of the apparatus, pulse width may be controlled without the necessity of the use of or incorporation of further circuitry or other hardware.

System Temperature Control

Figure 6:
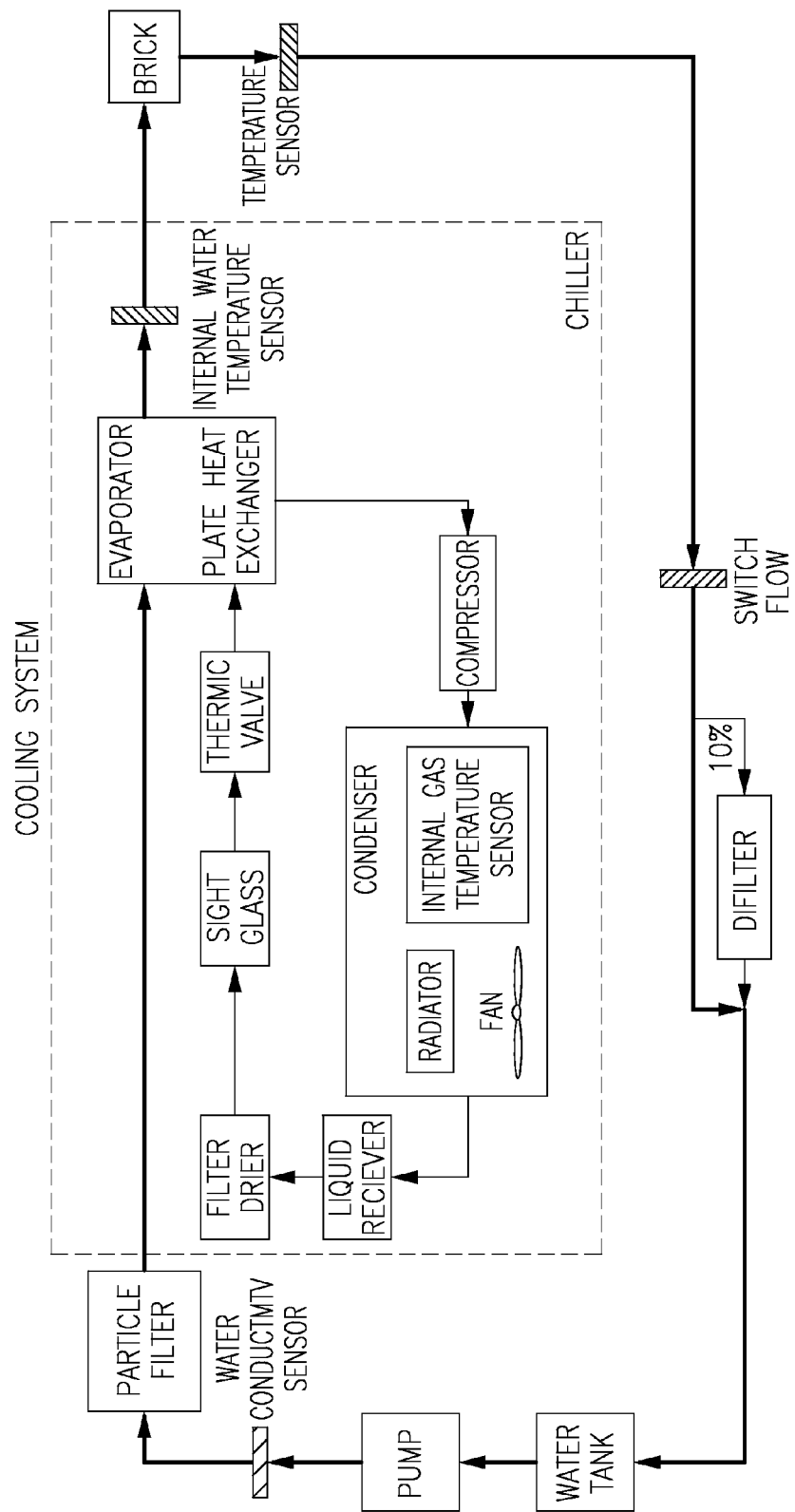
FIG. 6 is a schematic view of an exemplary apparatus cooling system used with the apparatus of the present invention.

As discussed above, known laser apparatus include devices for cooling the laser cavities themselves as well as the overall apparatus to prevent overheating and possible damage to the laser cavities. Many of these cooling systems operate at ambient room temperature and do not employ, as mentioned, active devices to cool the apparatus. However, it is known that cooling the laser cavity or cavities may be used to increase the overall power output of the laser cavity. Since the laser cavities such as shown in FIG. 1 are vacuum sealed, this will permit active cooling of the system without risking undue condensation may harm the laser cavity or other elements within the apparatus. In particular, with the use of Holmium laser device, which the laser beam is highly absorbable of water, water condensation on the laser rod within the laser cavity may cause the rod to explode. Vacuum sealing cavities and optical benches are both expensive and complex. A new design of the present invention permits the building of a cooling system which is an open system but as well cooling the laser with an active chiller which also avoids condensation. An exemplary cooling systems which may be used with the present invention is illustrated in FIG. 6 of the drawings.

There are usually temperature and humidity sensors contained within the cavity. Based on the outputs of the sensors, the dew point in the cavity/ambient room may be calculated. Once the dew point has been calculated, the controller within the system controls a cooling system accordingly. The system ensures that the working temperatures are high enough and far enough from the dew point to ensure that no condensation occurs. Therefore, for example, if the room calculated dew point is 25° C., lasing can begin without turning on the active chiller but only by circulating cooling water which is still at room temperature. This avoids condensation. In another example, if the calculated dew point based on the room conditions is 8° C., then active cooling can begin so that the water is cooled down to a temperature which is above the dew point and this in turn increases the efficiency of the laser power output. The desire is that the laser rod should work at as low as possible temperature, however a too low temperature which is below the dew point may cause condensation which, as struck above, may cause harm or destruction of the laser cavity. An additional benefit of active cooling is that by actively controlling the temperature of the laser apparatus, the power output of the laser apparatus can be controlled and higher power levels generated at lower temperatures, thus providing increased output from the laser cavities without the need of additional, relatively expensive laser equipment.

Control of Lasing with Suctioning

As described above, one of the problems associated with the use of laser fibers within the human body is the presence of blood and other disintegrated stone or other debris interfering with the view of the physician to control and direct the laser beam and have a good view of the target area. A suitable handpiece which may be used with a laser fiber is described in U.S. provisional application Ser. No. 61/927,426, filed Jan. 14, 2014 and assigned to the assignee of the present invention, the entire contents of which are herein incorporated by reference. The foregoing device described in the above application discloses a laser device which includes a suction module in a handpiece to allow the physician to not only apply laser energy to a target tissue but also to activate a suction function which is provided the same handpiece.

As shown in FIGS. 5A and 5B, a physician may be provided a user interface which allows the physician to set the suction to a number of different modes. In FIG. 5A, for example, the suction is set to a so-called "auto mode" and in FIG. 5B, the suction is set to a so-called "on mode". There also may be provided a so-called "off mode". The "on mode" and "off mode" speak for themselves: in the "off mode" suction is not turned on at all. In the "on mode" suction is always on. However, in the "auto mode", the controller of the system will activate the suction function during the application of laser energy. The amount of suctioning applied may be either adjusted manually by the physician to any level, including one or more preset levels, or may be automatic in accord with the set laser parameters, the energy per pulse delivered, the rate of repetition of the pulses applied, etc. This has the effect of clearing the area around the laser fiber tip so that any blood or stone debris is cleared from the physician's view while applying the laser energy, allowing a physician to better see the target stone or other object.

Thus, it may be seen that utilizing the precision servomotor control as well as incorporating the active cooling system above-described the system can reach high energy output levels in the range of 120 to 140 W.

While aspects of the present invention have been discussed in conjunction with a four laser cavity apparatus, it is clear that many aspects may be used on lasers with less than or more than four cavities, including a single laser cavity. For example, the rotating mirror and motor may be incorporated in any multiple laser cavity system or in any optical system in which precise mirror control is desired. The system for fast discharge of a capacitor bank may be used with other laser systems or even with non-laser systems such as systems using incoherent light. The system temperature control described in the present invention likewise may be used with other laser or non-laser apparatus. The lasering/suction control apparatus may likewise be utilized in other laser surgical or non-surgical systems.

What we claim is:

1. A calibration device for a multiple cavity laser system comprising:

a controller configured to operate the system and the calibration device;

a plurality of X number of laser cavities, each of the X number of laser cavities having an output end wherein, when activated by the controller, an output laser beam is emitted sequentially from the output end of each of the X number of laser cavities;

optics for combining and forwarding the sequential output laser beams along one or more optical paths to a rotating mirror;

the rotating mirror having a center and being operatively connected to the controller and to a servo motor and being tilted with respect the one or more optical paths;

wherein the servo motor includes a position encoder;

and wherein the servo motor is directed by the controller to position the rotating mirror to receive the output laser beams of the X number of cavities at encoded positions at which the rotating mirror is expected to be aligned with the respective output laser beams;

the servo motor, under direction of the controller, after moving the rotating mirror to the expected to be aligned positions, then redirecting the sequential output laser beams downstream along a common optical axis;

the rotating mirror being further controllable to be rotated by the servo motor a distance to correct for misalignment of one or more of the output laser beams with the center of the rotating mirror;

wherein the controller is configured to direct the servo motor to move the mirror to the optimal position of the position encoder so that each output laser beam impinging on the rotating mirror is at the closest encoded position to the center of the rotating mirror; and wherein the controller includes a memory operatively associated with the controller, the memory storing, for each laser cavity, the optimal encoded position of each laser beam closest to the center of the rotating mirror.

2. The multiple cavity laser system of claim 1 wherein the laser cavities are arranged with the cavities parallel to one another and the output ends arranged at the same end of each of the laser cavities.

3. The multiple cavity laser system of claim 2 wherein the number of laser cavities is four.

4. The multiple cavity laser system of claim 3 wherein the laser cavities are arranged in a 2×2 orientation.

5. A method of operating a multiple cavity laser system that has been calibrated by a calibration device comprising: providing the multiple cavity laser system of claim 1, further comprising, after the step of the controller storing in the memory the optimal adjusted encoded position of each laser beam that is closest to the center of the rotating mirror, next activating the multiple cavity laser system and thereby activating the plurality of X number of laser cavities, whereby the servo motor controls the retrieval of the adjusted optimum encoded positions for each of the X number of cavities as the rotating mirror moves to cause the center of the rotating mirror to be in line with laser beams from each of the cavities.

6. The multiple laser cavity system of claim 1 further comprising a first set of one or more mirrors positioned to receive the output laser beams and direct the beams to the rotating mirror.

7. The multiple laser cavity system of claim 6 further comprising a second set of one or more mirrors positioned downstream from the rotating mirror to receive the output laser beams from the rotating mirror and direct the beams to the common optical axis.

8. The multiple cavity laser system of claim 1, further comprising a safety shutter selectively insertable into the common optical axis under direction of the controller.

9. The multiple cavity laser system of claim 1 wherein the controller stores the position encoder in line positions for each of the X number of cavities and controls the retrieval of the in line positions as the rotating mirror moves to cause the rotating mirror to move the rotating mirror to the expected position of the rotating mirror to be aligned with each of the X number of cavities when the output beams are activated.

10. The multiple cavity laser system of claim 1, wherein the system operates in a range of frequencies from about 40 to about 100 Hz.

11. The multiple cavity laser system of claim 1, wherein the system operates in a range of frequencies of about 5 to about 100 Hz.

12. The multiple cavity laser system of claim 1, wherein the system operates with laser fiber diameters of 100 μm to 500 μm, 250-400 μm and from 200-300 μm.

13. The multiple cavity laser system of claim 1, wherein the system operates with laser fiber diameters of 200-230 μm.

14. The multiple cavity laser system of claim 1, wherein the system operates at power levels ranging from 20-150 watts.

* * * * *